US008147950B2

(12) United States Patent
Nagase et al.

(10) Patent No.: US 8,147,950 B2
(45) Date of Patent: Apr. 3, 2012

(54) METHOD FOR COATING A MULTILAYER FILM AND PRODUCT HAVING A MULTILAYER COATED FILM

(75) Inventors: Magonori Nagase, Kimitsu (JP); Katsunori Tobisawa, Kimitsu (JP); Yoshihiro Suemune, Kimitsu (JP); Hiroyasu Furukawa, Kimitsu (JP)

(73) Assignee: Nippon Steel Corporation, Tokyo (JP)

( * ) Notice: Subject to any disclaimer, the term of this patent is extended or adjusted under 35 U.S.C. 154(b) by 0 days.

(21) Appl. No.: 12/802,662

(22) Filed: Jun. 10, 2010

(65) Prior Publication Data

US 2010/0255276 A1 Oct. 7, 2010

Related U.S. Application Data

(62) Division of application No. 11/632,379, filed as application No. PCT/JP2005/013215 on Jul. 12, 2005, now Pat. No. 7,754,289.

(30) Foreign Application Priority Data

Jul. 14, 2004 (JP) ................................ 2004-206781

(51) Int. Cl.
*B32B 7/02* (2006.01)

(52) U.S. Cl. .................... 428/220; 428/212; 427/372.2; 427/402; 427/420

(58) Field of Classification Search .................. 428/212, 428/220; 427/372.2, 402, 420
See application file for complete search history.

(56) References Cited

U.S. PATENT DOCUMENTS 4,269,904 A 5/1981 Ikeno et al.
4,569,863 A 2/1986 Koepke et al.
5,458,921 A 10/1995 Briguglio et al.
5,677,004 A 10/1997 Tomaru et al.
7,166,342 B2 1/2007 Hayakawa et al.
2004/0013811 A1 1/2004 Muranaka
2004/0022954 A1 2/2004 Tsuda et al.

FOREIGN PATENT DOCUMENTS

DE 32 38 905 4/1984
EP 1 116 992 7/2001
JP 62-47075 10/1987
JP 2-203966 A 8/1990
JP 3-77675 A 4/1991
JP 7-24401 A 1/1995
JP 7-80395 A 3/1995
JP 2568821 10/1996
JP 10-76222 A 3/1998
JP 2001-509733 7/2001
JP 2001-323220 A 11/2001
JP 2003-062517 3/2003

OTHER PUBLICATIONS

European Search Report dated Sep. 30, 2010 in corresponding European Application No. EP 05 76 2066.

*Primary Examiner* — David Sample
*Assistant Examiner* — Lawrence Ferguson
(74) *Attorney, Agent, or Firm* — Kenyon & Kenyon LLP

(57) ABSTRACT

The invention provides a method of applying a mutilayer coating film, in which two or more layers of coating are applied to a flat plate, such as steel plate; and a product with multilayer coating film obtained by the method. The method includes discharging paint films through multiple slits, simultaneously applying these films to a traveling plate to thereby form a multilayer paint film and carrying out drying or baking thereof, characterized in that the boiling point of the solvent contained in the layer close to the plate is equivalent to or lower than the boiling point of solvent contained in the layer remote from the plate, and that the boiling point of solvent contained in the layer closest to the plate is lower than the boiling point of solvent contained in the layer remotest from the plate.

7 Claims, 5 Drawing Sheets

$$Ra = \frac{1}{l} \int_0^l |f(x)|\,dx$$

METHOD FOR COATING A MULTILAYER FILM AND PRODUCT HAVING A MULTILAYER COATED FILM

This application is a divisional application under 35 U.S.C. §120 and §121 of U.S. application Ser. No. 11/632,379, filed Jan. 12, 2007 now U.S. Pat. No. 7,754,289, which is a 35 U.S.C. §371 of PCT/JP05/13215 filed Jul. 12, 2005, which claims priority to Japanese Application No. 2004-206781, filed Jul. 14, 2004, which is incorporated herein by reference in its entirety.

TECHNICAL FIELD

The present invention relates to a method for coating a multilayer coated film, in which a multilayer film is baked and coated onto a steel sheet or other flat sheet, and a product having a multilayer coated film obtained by this method.

BACKGROUND ART

As is exemplified by precoated metal sheets, a method is known in which, when continuously applying a multilayer film of two or more layers onto a steel sheet or other flat sheet, and baking the film onto the sheet by rapid heating within about 90 seconds, the coating material is applied and baked for each layer after which this is repeated for the subsequent layers. In this method, however, since it is necessary for products to pass through the line a plurality of times in the case of ordinary application and baking lines, work efficiency is poor and the amount of energy required for baking becomes excessively large. In addition, if a line is attempted to be composed in which application and baking of all layers is completed in a single pass through the line, the line becomes excessively long, which together with resulting in poor production efficiency, leads to excessively high production equipment costs. Moreover, in the case of repeating application and baking for each layer, there are cases in which adhesion becomes poor when an upper layer is additionally formed on the uppermost lower layer that has been hardened by baking. In addition, there are cases in which the paint deteriorates when gas is absorbed through the upper layer during baking.

A known example of a technology for compensating for the aforementioned problems in the case of carrying out application and baking for each layer involves a so-called wet-on-wet application technology in which the next layer is applied before a previously applied layer is allowed to dry. Wet-on-wet technology is used as a so-called post-coating method, and normally at least 10 minutes are secured for the baking time. Since an upper layer is applied before a lower layer is allowed to dry completely, there are problems resulting from the interface being easily disturbed and the potential for entrapment of air bubbles in the vicinity of the interface.

A curtain application method is a known example of a method for simultaneously applying a plurality of layers of paint films on a flat sheet. JP 62-47075 B describes a method in which a compound layer is formed by allowing a plurality of fluid layers formed with a plurality of slit-like orifices to flow so as to mutually make surface-surface contact, and that compound layer is adhered on a moving web (flat sheet) in the manner of free-falling curtain to form a plurality of layers. This method is mainly used to produce photographic materials.

In JP 7-24401 A, a curtain application method is applied as a method for continuously applying a paint onto an object to be coated such as a steel sheet. The object to be coated is passed beneath a paint curtain that flows out and drops down from a slit-like nozzle to form a paint film by allowing the paint curtain to adhere to the upper surface of the object to be coated. The steel sheet to which paint has been applied is subsequently continuously sent to a drying oven where the solvent (volatile component) in the paint film is evaporated to bake or dry and harden the paint film.

During the baking of a steel sheet and the like, if the thickness of the paint film prior to baking is excessively thick, a phenomenon referred to as “popping” is known to occur in coated films following baking. Popping is a foam-like surface defect of a coated film surface, and appears in the form of a foam-like defect due to the formation of air bubbles within a coated film due to rapid evaporation of solvent remaining inside a coated film caused by heating during baking, which results in deformation of a previously hardened coated film surface. Its occurrence is particularly prominent in cases of thick coated films. In curtain application in which multilayer paint films are applied simultaneously, the thickness of the paint film prior to baking inevitably increases, thereby resulting in increased susceptibility to the occurrence of popping.

According to JP 7-24401 A, by making the solvent concentration of a paint film applied to an object to be coated prior to baking or drying on the side that contacts the object to be coated lower than that on the opposite side, the occurrence of popping during baking can be reduced.

DISCLOSURE OF THE INVENTION

When carrying out a coating method comprising simultaneous application and simultaneous baking of multilayer film using curtain application and so forth, an optimum solvent concentration is determined for the solvent concentration in the supplied paint from the viewpoint of satisfactory curtain application and satisfactory coating. Thus, as described in JP 7-24401 A, if the solvent concentration in a paint on the side that makes contact with an object to be coated is attempted to be made lower than that on the opposite side, the solvent concentration in the film on the side that contacts the object to be coated either becomes lower than the optimum concentration, or the solvent concentration in the film on the opposite side becomes higher than the optimum concentration, thereby impeding the formation of a satisfactory coated film.

In the case of simultaneously applying and baking a thick multilayer paint film, popping occurs easily in the case the total film thickness following drying or baking exceeds 20 μm. On the other hand, even in cases in which the total film thickness after baking or drying is 20 μm or less, there are cases in which popping occurs easily if, for example, a clear coating film is present on the upper layer. This is because since there is no pigment in a clear coating film, there is no interface between pigment and resin to serve as a channel for the escape of solvent. In addition, if the baking rate is increased, there is increased likelihood of popping even in cases in which the total film thickness after drying or baking is 20 μm or less.

An object of the present invention is to provide a method for coating a multilayer film on a flat sheet such as a steel sheet, in which a multilayer film having two or more layers is simultaneously applied and baked, said method being able to prevent the occurrence of popping, and a product having a multilayer coated film obtained by that method.

In the case of drying or baking after applying a thick paint film on the surface of a sheet, regardless of whether a single layer or multiple layers are applied, the occurrence of popping can be prevented by allowing the solvent in the paint film, including the solvent in the paint film closest to the sheet, to adequately escape. In order to allow the solvent in the paint film close to the sheet (lower layer) to adequately escape, it is important to allow the solvent of the lower layer to escape from the paint film surface by passing through the paint film of the upper layer before the solvent component passage resistance of the side close to the paint film surface (upper layer) becomes higher than that of the lower layer.

In the present invention, by focusing on the boiling points of solvents in a paint film, and selecting the solvent in each layer so that the solvent boiling points become higher moving from the lower layer to the upper layer, it was found that the solvent of the lower layer is able to easily escape from the paint film surface by passing through the paint film of the upper layer before the solvent component passage resistance of the upper layer paint film becomes excessively high, thereby making it possible to prevent the occurrence of popping.

The present invention was completed on the basis of the aforementioned finding, the gist of which is described below.

(1) A method for coating a multilayer film comprising: discharging a plurality of paint films from a plurality of slits, simultaneously applying these paint films onto a moving sheet to form a multilayer paint film, followed by drying or baking thereof; wherein, the relationship between the boiling points of solvents contained in adjacent layers of the multilayer paint film is such that the boiling point of the solvent contained in the layer closer to the sheet (lower layer) is equal to or lower than the boiling point of the solvent contained in the layer farther from the sheet (upper layer), and the boiling point of the solvent contained in the layer closest to the sheet (lowermost layer) is lower than the boiling point of the solvent contained in the layer farthest from the sheet (uppermost layer).

(2) A method for coating a multilayer film according to (1) above wherein, the boiling points of the solvents contained in the layers that compose the multilayer paint film sequentially increase moving from the layer closest to the sheet (lowermost layer) to the layer farthest from the sheet (uppermost layer).

(3) A method for coating a multilayer film according to (1) above wherein, a multilayer paint film of three or more layers is formed, and in the case the thickness of a multilayer coated film obtained by drying or baking thereof is 25 μm or less, the boiling points of the solvents contained in two or more consecutive layers of the multilayer paint film are equal.

(4) A method for coating a multilayer film comprising: discharging a plurality of paint films from a plurality of slits, simultaneously applying these paint films onto a moving sheet to form a multilayer paint film, followed by drying or baking thereof; wherein, a multilayer coated film having a thickness of 15 μm or less is formed from a multilayer paint film having three or more layers, the boiling point of the solvent contained in the layer of the multilayer paint film closest to the sheet (lowermost layer) is lower than the boiling point of the solvent contained in the layer farthest from the sheet (uppermost layer), and the solvent or solvents contained in one or more layers, excluding the layer closest to the sheet and the layer farthest from the sheet, has any arbitrary boiling point or points.

(5) A method for coating a multilayer film according to any of (1) to (4) above wherein, the composition of the paint of each layer of the multilayer paint film, excluding the solvent, is mutually different.

(6) A method for coating a multilayer film according to any of (1) to (4) above wherein, a portion or all of the sets of adjacent layers of the multilayer paint film have the same composition excluding the solvents of the paints of those layers.

(7) A method for coating a multilayer film according to any of (1) to (6) above wherein, the temperature range that contains both the boiling point of the solvent used having the lowest boiling point and the boiling point of the solvent used having the highest boiling point is designated as a temperature control range, and the heating rate for drying or baking the multilayer paint film is controlled within this range.

(8) A method for coating a multilayer film according to (7) above wherein, the heating rate in the temperature control range is smaller than the overall average heating rate for drying or baking of the applied multilayer point film.

(9) A method for coating a multilayer film according to (7) above wherein, the temperature control range contains a lower temperature control range that contains the boiling point of the solvent used having the lowest boiling point, and an upper temperature control range that contains the boiling point of the solvent used having the highest boiling point, and heating rates are used in the lower temperature control range and the upper temperature control range that are controlled to be below the overall average heating rate.

(10) A method for coating a multilayer film according to (9) above wherein, the control range of a heating device for carrying out drying or baking is divided into at least four control segments, the heating rate is controlled in each control segment, one control segment is designated as the lower temperature control range, and a different control segment is designated as the upper temperature control range.

(11) A method for coating a multilayer film according to any of (1) to (10) above wherein, the multilayer paint film formed on the sheet is preheated prior to drying or baking.

(12) A method for coating a multilayer film according to (11) above wherein, the preheating is carried out at a limiting temperature up to 20° C. lower than the boiling point of the solvent having the lowest boiling point.

(13) A product having a multilayer coated film on the surface of a base material; wherein, the relationship between the boiling points of residual solvents contained in adjacent layers of the multilayer coated film is such that the boiling point of the residual solvent contained in the layer closer to the base material (lower layer) is equal to or lower than the boiling point of the residual solvent contained in the layer farther from the base material (upper layer), and the boiling point of the residual solvent contained in the layer closest to the base material (lowermost layer) is lower than the boiling point of the residual solvent contained in the layer farthest from the base material (uppermost layer).

(14) A product having a multilayer coated film according to (13) above wherein, the boiling points of the residual solvents contained in the layers that compose the multilayer coated film sequentially increase moving from the layer closest to the base material (lowermost layer) to the layer farthest from the base material (uppermost layer).

(15) A product having a multilayer coated film according to (13) above wherein, a multilayer coated film of three or more layers is formed, and in the case the thickness of the multilayer coated film is 25 μm or less, the boiling points of the residual solvents contained in two or more consecutive layers are equal.

(16) A product having a multilayer coated film of three or more layers on the surface of a base material; wherein, the thickness of the multilayer coated film is 15 μm or less, the boiling point of the residual solvent contained in the layer of the multilayer coated film closest to the base material (lowermost layer) is lower than the boiling point of the residual solvent contained in the layer farthest from the base material (uppermost layer), and the boiling point or points of the residual solvent or solvents contained in one or more layers, excluding the layer closest to the base material and the layer farthest from the base material, is arbitrary.

(17) A product having a multilayer coated film according to any of (13) to (16) above wherein, the composition of each layer of the multilayer coated film, excluding the residual solvent, is mutually different.

(18) A product having a multilayer coated film according to any of (13) to (16) above wherein, a portion or all of the sets of adjacent layers of the multilayer paint film have the same composition excluding their residual solvents.

(19) A product having a multilayer coated film according to any of (13) to (18) above having a primer coated film beneath the multilayer coated film.

According to the present invention, in a method for coating a multilayer film by discharging a plurality of paints from a plurality of slits, simultaneously applying the paint films onto a moving sheet to form a multilayer paint film, followed by drying or baking thereof, the occurrence of popping can be prevented by selecting a solvent in each layer so that the boiling points of the solvents increases moving from the lower layers to the upper layers. In particular, in a multilayer paint film having three or more layers, in the case the thickness of an entire multilayer film obtained by drying or baking a multilayer paint film is thin, for example, 25 μm or less, the boiling points of the solvents contained in some of the consecutive layers may be equal. In addition, in the case of forming a multilayer film by using a multilayer paint film having three or more layers, when the total thickness of a multilayer film obtained by drying or baking a multilayer paint film is 15 μm or less, the solvents of intermediate layers other than the lowermost layer and uppermost layer may have any arbitrary boiling point or points provided it satisfies the condition that the boiling point of the solvent contained in the lowermost layer of the multilayer paint film closest to the sheet is lower than the boiling point of the solvent contained in the uppermost layer farthest from the sheet, namely the boiling points of the intermediate layers may be equal to, or lower or higher than, the boiling point of their upper layer or lower layer.

BEST MODE FOR CARRYING OUT THE INVENTION

A method for coating a multilayer film of the present invention can be applied to any method for coating a multilayer film in which a plurality of paints are discharged from a plurality of slits, these films are simultaneously applied to a moving sheet to form a multilayer paint film, followed by drying or baking thereof.

A curtain application method can be used as a method for coating a multilayer paint film. A curtain application device used in the curtain application method has two or more slits, and when paint is discharged from each slit, the discharged paint becomes a liquid film that flows down along a slide. For example, in the case of using a curtain application device having three slits for coating a coated film composed of three layers, the liquid film discharged from the first slit flows down over the slide to the location of the second slit where it contacts the liquid film discharged from the second slit and forms a liquid film having two layers. Subsequently, this two-layer liquid film flows down to the third slit where it contacts the liquid film discharged from the third slit and forms a liquid film having three layers. The three-layer liquid film flows down along the slide, separates from the slide at the end of the slide, and then falls freely in the form of a three-layer multilayer film curtain. A target object in the form of a sheet on which curtain application is to be carried out travels below the curtain application device. The multilayer film curtain that has fallen onto the surface of the sheet is deposited on the surface of the sheet while retaining its multilayer state, resulting in the formation of a paint film having a plurality of layers on the surface of the sheet.

Figure 1:
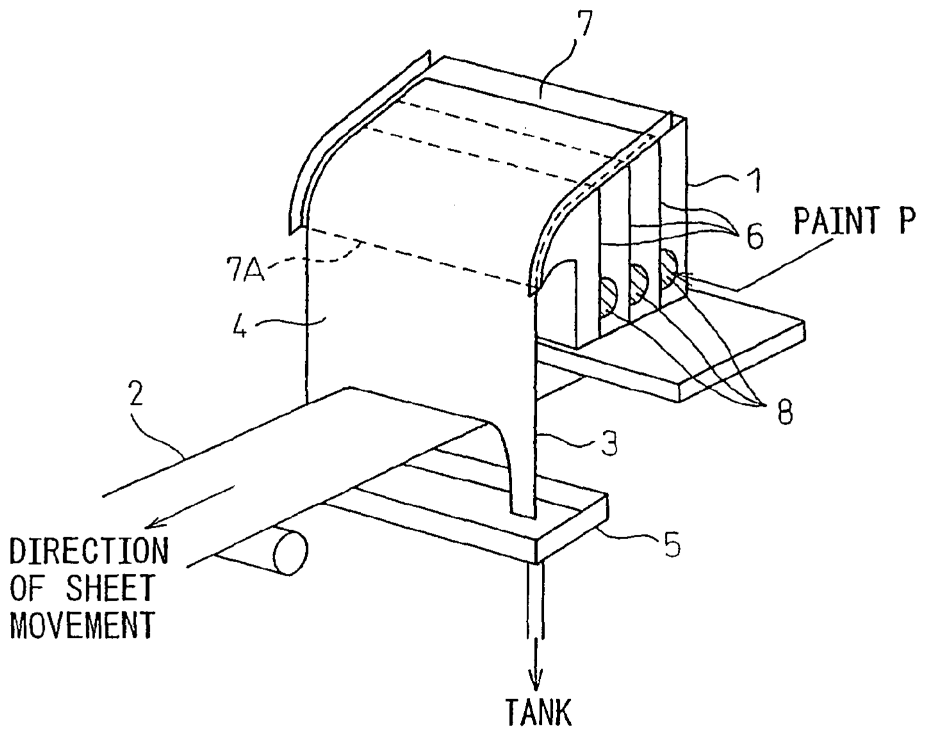
FIG. 1 is a schematic drawing illustrating a sliding hopper type of curtain application device.

More specifically, an explanation is provided by referring to the sliding hopper-type curtain application device schematically shown in FIG. 1. Paint feed ports 8 and slits 6, from which paint for three layers is quantitatively supplied by a gear pump and so forth, are installed in sliding hopper 1. Curtain guides 3 are provided so as to contact both ends of a lip 7A of a sliding surface 7. A paint pan 5 is installed below said lip 7A, and paint freely falls to paint pan 5 by curtain guides 3. A paint P forms a liquid film by being supplied uniformly in the direction of width to sliding surface 7 through slits 6 from each paint supply port 8 of sliding hopper 1, and is laminated on sliding surface 7. The three laminated layers of paint form a paint curtain 4, which is uniform in the direction of width, due to curtain guides 3 when falling into paint pan 5 from the ends (lip 7A) of sliding surface 7. By passing a band-like base material, such as band steel 2, through this curtain 4, the three layers of paint can be simultaneously applied to the surface of band steel 2. A plurality of layers of coated films can be simultaneously formed on a base material corresponding to the number of liquid films of the paint that composes curtain 4.

A curtain application method can also be used in the production of photographic materials (photographic film) as previously described. Water is used for the solvent of coatings applied in the field of photographic materials, and the coating heating temperature is about 100° C. In contrast, a plurality of organic solvents having different boiling points are used in the present invention, and the heating temperature reaches, for example, 200° C. or higher in the case of forming a coated film on a steel sheet. In the case of heating at such high temperatures, popping occurs easily if the heating rate is increased to increase the production rate. In the case of coating by curtain application in the field of photographic materials, the problem of popping does not occur since the coating is heated slowly at a low temperature.

Examples of other multilayer application methods that can be used include a sliding bead device that does not form a curtain, and a die coater device that discharges paint from plurality of slits in close proximity to each other to form a multilayer film without using a slide. These devices are equivalent to curtain application devices in that they are able to simultaneously form a multilayer paint film.

Methods for forming a multilayer paint film include a wet-on-wet coating method. The wet-on-wet coating method is widely used primarily in the automobile field as a method for applying a coating to a base sheet after forming, and is a type of so-called post-coating method. In this method, a paint is applied on a base material, a different paint is applied to the upper layer before the paint dries by spraying or electrostatic coating, and the resulting laminated paint layers are simultaneously dried to form a coated film.

In the wet-on-wet coating method, the occurrence of popping can be prevented comparatively easily due to the coating conditions of (1) there being a slight amount of leeway in the time for drying the lower layer between the time from applying the lower layer to the time of applying the upper layer, and (2) pre-drying normally being able to be carried out before drying in post-coating, and a time of 10 minutes or more being capable of being secured for baking time. However, since the upper layer is applied before the lower layer completely dries, the interface of the paint film is easily disturbed and there is the problem of the possibility of air bubbles being entrapped in the vicinity of the interface.

In contrast, the present invention is a product produced by a coating method consisting of baking by continuous and comparatively high-speed heating as represented by pre-coated metal sheets, and a coating method for coating such products. This coating method is intrinsically different from post-coating and wet-on-wet coating methods. In the method used by the present invention in which a plurality of paint films are collectively and simultaneously applied to a target base material, in addition to the absence of a time difference between coating of the lower layers and upper layers, baking time is short at 90 seconds or less, thereby making the suppression of popping more difficult than wet-on-wet coating. However, in this method, since multiple layers are applied simultaneously, there is the advantage of not causing large disturbances in the paint film interface or entrapment of air bubbles.

In addition, a product having a multilayer coated film of the present invention can be clearly distinguished from products produced by a wet-on-wet coating method with respect to the following points. Because of the principle used, in a product of the present invention, the thickness and ratio of each layer of the coated film are nearly uniform at all locations. Even at a location where a base material is processed, the thickness of each layer of the coated film changes at the same rate according to the degree of processing. For example, at a location where the base material is subjected to deformation that causes it to double in length, the film thickness of the coated film at that location uniformly becomes one-half the original thickness for each layer, and the ratio of their film thicknesses does not change. In addition, at a cut end, the base material is exposed. In contrast, in a product produced by a wet-on-wet coating method, since each layer is coated independently, the ratio of the thickness of each layer of the coated film varies depending on the location, and at a location where the base material is subjected to processing, there is no correlation as described above between the rate of deformation of the base material and the thickness of the coated film. In addition, at a cut end, the end is covered as a result of the paint moving around the end due to the use of post-coating.

These characteristics are clear from the observation of cross-sectional photographs of coated products. At the interface of two layers in a coated film obtained by simultaneously applying a plurality of paint films followed by drying according to the present invention, the center line average roughness Ra is 0.3 μm or more, for example, 0.3 to 0.6 μm or 0.3 to 0.8 μm, and the maximum value of roughness Rmax is 2 μm or less.

Here, center line average roughness Ra of the coated film interface can be determined using the following method. A section obtained by cutting a coated sheet is embedded in resin and polished, the cross-section perpendicular to the surface of the coated film is smoothened, and a scanning electron micrograph is obtained at a magnification of 3500. A transparent sheet used for OHP is placed over the micrograph, and after precisely tracing the surface irregularities of the interface, the area of the sections containing vertical lines shown in FIG. 2 is measured with an image processing device to determine Ra of the interface, as an average, from the following equation:

$$Ra = \left( \int_0^1 |f(x)| dx \right) \Big/ 1.$$

Figure 2:
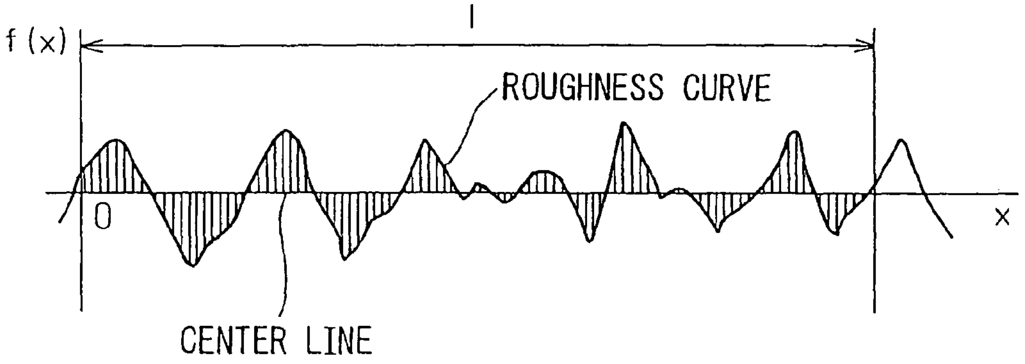
FIG. 2 is a drawing illustrating measurement of the Ra of a coated film interface.

A simpler method for measuring Ra may be used in which, after precisely tracing the surface irregularities of the interface, a line representing the average value corresponding to the center line in FIG. 2 is drawn, the sheet is cut out along the traced curve, the weights of the sections above and below the average line are measured, and those weights are converted to an average length to determine Ra.

Rmax can be determined by measuring the maximum value of the surface irregularities from an electron micrograph obtained at a magnification of 500 of a section embedded in resin and polished as described above.

There have been no previous methods for coating a multilayer film by carrying out drying or baking after forming a multilayer paint film that focused on the boiling points of solvents contained in the paint. Although JP 7-24401 A indicates that the occurrence of popping during baking can be reduced by focusing on solvent concentration and making the solvent concentration on the side that contacts a coated object lower than that on the opposite side, there is no suggestion whatsoever regarding changing the boiling point by changing the type of solvent.

Although there is no intention of being bound by theory, the inventors of the present invention presume as follows with respect to the coating of a multilayer film in the present invention. When carrying out drying or baking after having formed a multilayer paint film on a sheet, in addition to the temperature of the multilayer paint film on the sheet surface rising, the solvent in the multilayer paint film disperses and escapes from the multilayer paint film surface, thereby causing a decrease in solvent concentration to progress. Since the solvent escapes from the multilayer paint film surface, the rate of decrease in solvent concentration is naturally faster the closer to the surface of the paint film.

Figure 3:
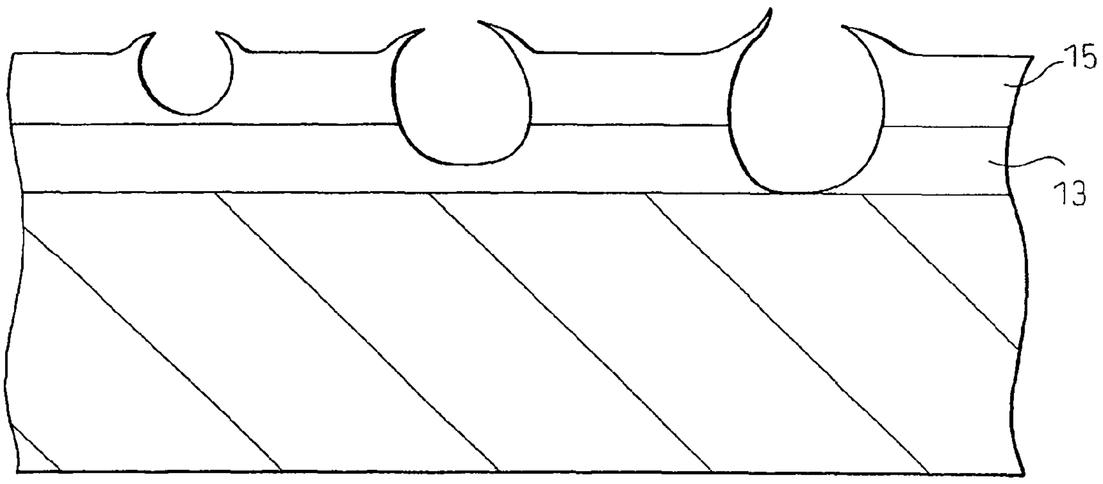
FIG. 3 is a drawing providing a general illustrating of popping that can occur in coated films.

If the temperature is raised further during heating for drying or baking, and reaches a temperature higher than the boiling point of the solvent in the paint film, the solvent changes into gas components dissolved in the paint film. On the other hand, a paint crosslinking reaction begins, after which the diffusion resistance of the solvent in the paint film increases, while gas flow resistance increases when gas components originating in the solvent pass through from lower layers. Thus, if the crosslinking reaction at a layer farther from the sheet (upper layer) of a multilayer paint film formed on a sheet proceeds earlier than that of a lower layer, the solvent contained in the layer closer to the sheet (lower layer) is unable to escape from the upper layer. If the temperature is continued to be raised, the solvent contained in the lower layer forms gas bubbles, and these bubbles deform the previously hardened coated film surface thereby resulting in bubble defects and the occurrence of popping. FIG. 3 schematically shows popping that has occurred in a two-layer coated film. In the example shown on the left side of the drawing, popping has occurred in upper layer 15 of the two-layer coated film. In the example in the center, popping has occurred extending from lower layer 13 to upper layer 15 due to the formation of bubbles in lower layer 13. The example on the right side shows an extreme example of popping that has occurred due to the formation of bubbles in lower layer 13. In this case, the substrate (such as a steel sheet) is exposed at the bottom of the location where popping has occurred.

In the present invention, the solvent of each layer is selected so that the boiling points of the solvents increase moving from the lower layers to the upper layers. More specifically, the boiling points of solvents contained in adjacent layers of a multilayer paint film are such that the boiling point of the solvent contained in the layer closer to the sheet (lower layer) is equal to or lower than the boiling point of the solvent contained in the layer farther from the sheet (upper layer), and the boiling point of the solvent contained in the layer closest to the sheet (lowermost layer) is lower than the boiling point of the solvent contained in the layer farthest from the sheet (uppermost layer).

When this relationship is expressed by an equation, wherein the film of the lowermost layer in a multilayer film having n layers is represented by $R_l$, the film of the uppermost layer is represented by $R_n$, adjacent films are represented by $R_1, R_2, \ldots R_{n-1}$ and $R_n$, and the boiling points of the solvents contained in the paints of each film $R_1, R_2, \ldots R_{n-1}, R_n$ are represented by $B_1, B_2, \ldots B_{n-1}$ and $B_n$, then the following relationships can be applied.

$$B_1 \leqq B_2 \leqq \ldots \leqq B_{n-1} \leqq B_n$$

$$B_l < B_n$$

The difference between boiling point $B_l$ of the solvent of film $R_1$ of the lowermost layer and boiling point $B_n$ of the solvent of film $R_n$ of the uppermost layer is preferably at least 10° C., and the difference between boiling point $B_1$ and boiling point $B_n$ is preferably at least 20° C.

When focusing on the adjacent layers of a multilayer paint film, the temperature reaches the boiling point of the solvent contained in the layer closer to the sheet (lower layer) before it reaches the boiling point of the solvent contained in the layer farther from the sheet (upper layer) during heating. Consequently, when the solvent in the lower layer vaporizes, the solvent still remains in the upper layer, and the solvent in the lower layer is able to easily pass through the upper layer thereby making it possible to prevent the occurrence of popping in the lower layer.

When solvent escapes after simultaneously applying multiple layers, ideally the reaction of resin in the layer on the lowermost layer is suppressed until the solvent in the paint film of the lowermost layer adequately escapes, the gas flow resistance remains low, the reaction within that layer proceeds while solvent in the layer on the uppermost layer escapes after solvent in the paint film of the lowermost layer has escaped, and a similar state is repeated in the layer above. Since the present invention realizes this ideal drying or baking of multiple layers, or drying or baking that approaches said ideal drying or baking, a solvent within a multilayer paint film is able to adequately escape without causing popping.

For example, in the case of a three-layer multilayer film, if the boiling point of the solvent of the first layer (lowermost layer) is made to be lower than the boiling point of the solvent of the second layer above it, and the boiling point of the solvent of the second layer is made to be lower than the boiling point of the solvent of the third layer (uppermost layer) above the second layer, evaporation of solvent begins first from the lowermost layer, and since evaporation of solvent of the layers above the lowermost layer has not yet begun at that time, the reaction of the resin and so forth in those layers does not proceed, thereby enabling the solvent present in the lowermost layer to pass through the upper layers having low gas flow resistance and escape.

Most preferably, the boiling points of solvents contained in adjacent layers of a multilayer paint film are such that the boiling point of the solvent contained in a layer closer to the sheet (lower layer) is lower than the boiling point of the solvent contained in a layer farther from the sheet (upper layer) (in other words, the boiling points are not at the same temperature) for all combinations of adjacent layers.

In some cases, the boiling point of a solvent contained in a layer closer to the sheet (lower layer) may be equal to the boiling point of the solvent contained in the layer farther from the sheet (upper layer). In this case, the total thickness of all layers after drying or baking is preferably 25 μm or less so as to effectively suppress the occurrence of popping by allowing the solvent of the lower layer to easily pass through the upper layer. This is because, if the layer thickness is 25 μm or less, since the solvent is able to easily escape from that layer, the occurrence of popping can be suppressed even if the boiling point of the solvent of this layer is equal to the boiling point of the solvent in the adjacent layer.

Moreover, in the case the total thickness of a multilayer paint film after drying or baking is 15 μm or less, the solvents of intermediate layers other than the lowermost layer and uppermost layer may have any arbitrary boiling point. In other words, the boiling points of solvents of the intermediate layers may be equal to, lower than or higher than the boiling point of the layer above or below it. Namely, in this case, the boiling point of the solvent contained in a layer closer to the sheet (lower layer) may be higher than the boiling point of the solvent contained in a layer farther from the sheet (upper layer). This is because, if the film thickness is 15 μm or less, the solvent in the film of the lower layer is able to escape easily from the film of the upper layer thereby making it possible to suppress the occurrence of popping even if the relationship between the boiling points of the upper and lower layers is reversed.

A “boiling point” of a solvent in the present invention can be defined as the temperature at which a solvent boils. In the case of using one type of solvent in a paint that forms a single layer, the boiling point of the solvent can be equal to the boiling point of a specific solvent used, and drying of the paint is able to occur primarily at that boiling point.

In the case of a mixed solvent containing two or more types of solvents in a single layer, if this is assumed to be a liquid in which the solvents are completely mixed, the boiling point of this mixed solvent is within a range extending from the lowest boiling point of the two or more types of solvents to the highest boiling point, and drying of the paint is thought to occur primarily within this range. Thus, a “boiling point” of a solvent in this case can be defined to be the temperature range from the lowest boiling point of the two more types of solvents to the highest boiling point of the two or more types of solvents.

It is also possible that a mixed solvent is not a completely mixed liquid, but rather an azeotropic mixture. Azeotropic mixtures consist of maximum boiling point azeotropic mixtures in which the boiling point demonstrates the maximum value, and minimum boiling point azeotropic mixtures in which the boiling point demonstrates the minimum value. In the case of the former, drying of a paint containing an azeotropic mixed solvent is considered to occur primarily within a range from the boiling point of the solvent with the lowest boiling point to the maximum boiling point of the mixture. Therefore, a "boiling point" of a solvent in this case can be defined as the temperature range from the boiling point of the solvent with the lowest boiling point to the maximum boiling point of the mixture. In the case of the latter, namely a minimum boiling point azeotropic mixture, drying of a paint containing an azeotropic mixed solvent is considered to occur primarily within a range from the minimum boiling point of the mixture to the boiling point of the solvent having the highest boiling point. Therefore, a "boiling point" of a solvent in this case can be defined as the temperature range from the minimum boiling point of the mixture to the boiling point of the solvent with the highest boiling point.

With respect to the composition of the components of a paint excluding the solvent (solid components that form the paint film), the paint composition of each layer that composes a multilayer film is mutually different in an ordinary multilayer coated film. In contrast, in the present invention, the composition of the components of paint of each layer that composes a multilayer film except for the solvent (solid components) may be mutually different, or a portion or all of the sets of adjacent layers of a multilayer film may have the same composition of components of the paint for those layers except for the solvent. For example, in the case of coating a thick film having a single layer, if this one layer is coated in a single coating followed by drying or baking as in the prior art, the film thickness becomes excessively thick, thereby making it impossible to prevent the occurrence of popping. In the present invention, by making the paint composition of all layers of a multilayer film the same except for the solvent, and selecting the solvent in each layer so that the boiling points of the solvents become higher moving from the lower layers to the upper layers, a film can be formed by coating a single thick film followed by drying or baking while preventing the occurrence of popping. In addition, use of a method of the present invention a multilayer coated film can be obtained having a thick portion formed from a plurality of layers having the same composition in a portion thereof by making the paint composition of a portion of the adjacent layers of the multilayer film the same, excluding the solvents, and selecting solvents such that the boiling points of the solvents become higher moving from the lower layers to the upper layers.

In the case of simultaneously applying a plurality of layers according to the present invention, since the paint composition, including the solvent, of each film of the applied multilayer film differs, the gas flow resistance of each film is mutually different. For example, if there is a clear coating film on the uppermost surface layer, since a pigment that facilitates the formation of a channel for the solvent to escape is not contained in a clear coating film, an interface between the pigment and resin, which is thought to serve as a channel for the escape of solvent, is not present, and gas flow resistance increases thereby increasing susceptibility to the occurrence of popping. Even in such cases, the application of the present invention makes it possible to form a satisfactory coated film that is free of the occurrence of popping.

In the present invention, the occurrence of popping was found to be able to be even more effectively prevented by adjusting the heating rate during drying or baking so that the temperature range that contains both the boiling point of the solvent having the lowest boiling point among the solvents used and the boiling pint of the solvent having the highest boiling point is used as a temperature control range, and the heating rate is controlled within this range. The heating rate within the temperature control range is preferably lower than the overall average heating rate for drying or baking the applied multilayer paint film. Improvement of the degree of smoothness of the coated film surface after baking was also found to be a secondary effect of this heating rate control. In the case of forming a coated film using a plurality of paints containing solvents having different boiling points according to the present invention, the temperature range in which the solvent evaporates is wider in the present invention due to the presence of solvents having different boiling points, in comparison with a coated film formed using only one type of paint. Consequently, the duration of disturbances that occur when vapor generated by evaporation of solvent escapes from the surface becomes longer, and this has an effect on the degree of surface smoothness. Adjustment of the heating rate is effective for suppressing disturbances caused by the passage of vapor, and the degree of smoothness of a coated film surface is thought to improve because of this.

As one example of this, in the case of producing a steel sheet on which a multilayer coated film is formed by heating a steel sheet on which a paint multilayer film has been formed from room temperature to a peak metal temperature of 230° C. within 90 seconds, by using the overall average heating rate of 7° C./s or less, and setting the heating rate of the aforementioned temperature control range to a lower rate, the occurrence of popping can be effectively suppressed. The heating rate of this temperature control range is dependent on the thickness of the coated film formed, and in the case of, for example, the coated film formed having a thickness of about 50 μm, the heating rate is preferably 6° C./s or less, and in the case of a thickness of about 100 μm, the heating rate is preferably 5° C./s or less.

On the other hand, the aforementioned temperature control range may be divided into a certain temperature range that contains the boiling point of the solvent having the lowest boiling point among the solvents used (lower temperature control range), and a certain temperature range that contains the boiling point of the solvent having the highest boiling point (upper temperature control range). An intermediate range can also be provided between the lower temperature control range and upper temperature control range. In the lower temperature control range and upper temperature control range, a heating rate is used that is controlled to be below the overall average heating rate, and in the case of providing an intermediate range, the heating rate in that range may be constant in some cases, and is not required to be below the overall average heating rate.

Preferably, the temperature control range has for its starting temperature a temperature that is lower than the boiling point of the solvent having the lowest boiling point (lower limit of the temperature range corresponding to the boiling point in the case of a mixed solvent), and has for its ending temperature a temperature higher than the boiling point of the solvent having the highest boiling point (upper limit of the temperature range corresponding to the boiling point in the case of a mixed solvent). This is also applicable to the respective starting and ending temperatures of a lower temperature control range and upper temperature control range in the case of dividing the temperature control range so as to contain a lower temperature control range and upper temperature control range. For example, the starting temperature can be a temperature that 30° C., 20° C., 10° C. or 5° C. lower than the boiling point of the solvent having the lowest boiling point, while the ending temperature can be a temperature that is 5° C. or 10° C. higher than the boiling point of the solvent having the highest boiling point. Although a heating rate of the temperature control range is directly involved in suppressing the occurrence of popping, and widening that range is even more effective in suppressing the occurrence of popping, in that case, drying time becomes longer thereby lowering productivity. Thus, the actual starting and ending temperatures of the temperature control range should be determined while taking this factor into consideration.

It is necessary that the heating device used for controlling temperature in the manner described above be able to control heating rate within a range that contains two different temperatures (or temperature ranges). In order to accomplish this, the temperature control range of the heating device is preferably divided into at least four segments, and the heating rate for controlling the heating rate in each control segment is able to be independently controlled. In this case, one segment is designated as the aforementioned lower temperature control range, while another segment is designated as the aforementioned upper temperature control range.

Figure 4:
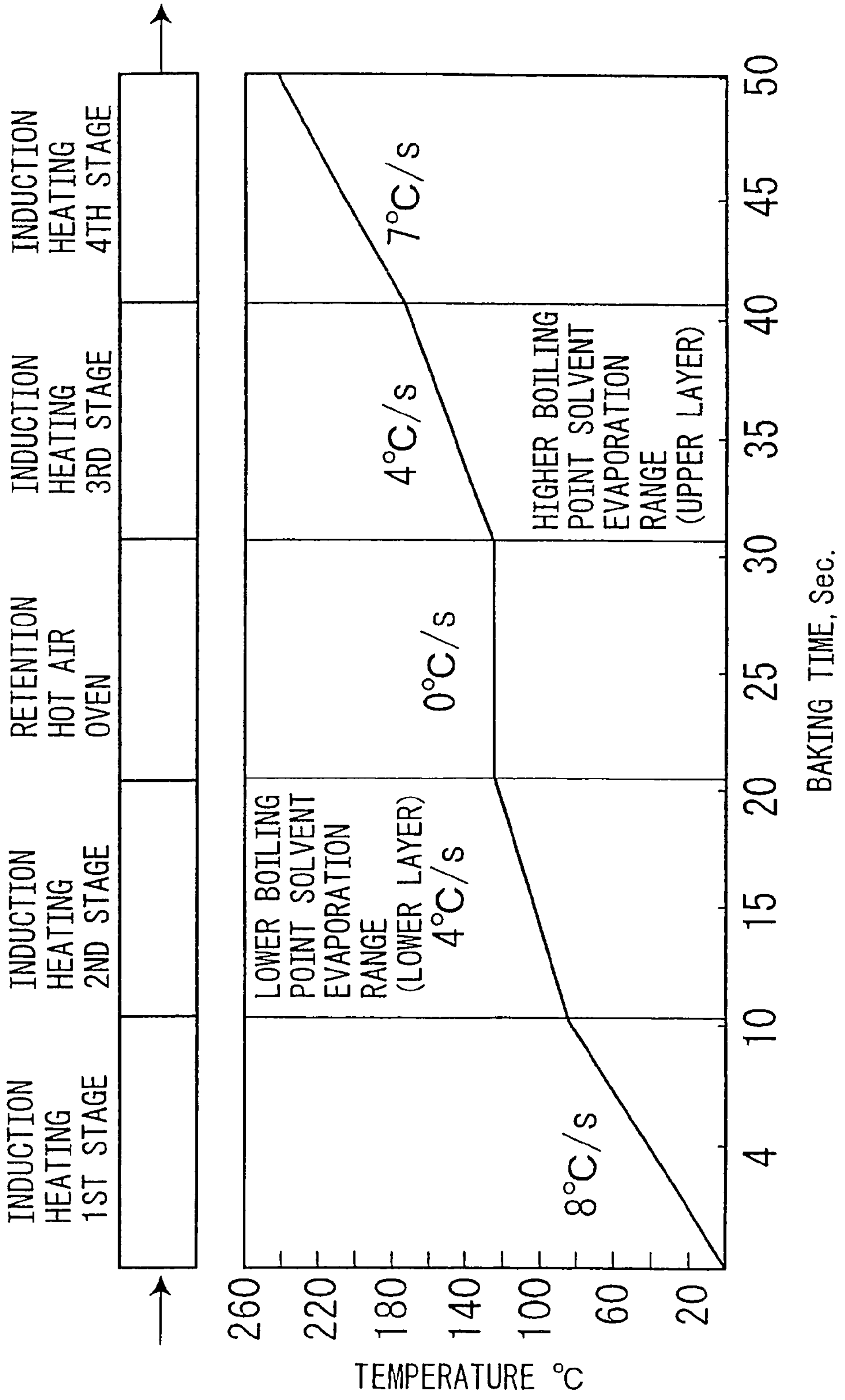
FIG. 4 is a drawing explaining steel sheet temperature control in the case of having divided the temperature control range of a heating device used in the present invention into four control segments.

The example shown in FIG. 4 shows the manner in which temperature rises in the case of dividing the temperature control range of an induction heating oven into four control segments, providing a retention hot air oven between the second and third stages of induction heating, designating the second stage of induction heating as a lower temperature control range having a heating rate of 4° C./s, and designating the third stage of induction heating as the upper temperature control region having a heating rate of 4° C./s.

In the present invention, a gas heating oven or an induction heating oven can be used for the heating device. An inducting heating oven is preferable from the viewpoint of being easier to control. In order to harden the surface of the coated film, gas heating may be combined with induction heating in the segment of the latter half of the inducting heating oven.

It is advantageous to carry out the heating step for drying or baking the applied multilayer film slowly in order to suppress the occurrence of popping. However, if too much time is allocated to this heating step, productivity decreases. In order to solve this dilemma, it is extremely effective to add a preheating step before the heating step. Preheating can be carried out rapidly up to a predetermined temperature (preheating temperature) that is lower than the temperature at which significant vaporization of the solvent having the lowest boiling point in the applied paint begins, thereby making it possible to relatively shorten the amount of time required by the heating step. In addition, preheating is also effective for removing water molecules and impurities adsorbed on the substrate. For example, preheating can be carried out by using as the limiting temperature a temperature that is 30° C. lower or 20° C. lower than the boiling point of the solvent having the lowest boiling point (the boiling point of the solvent having the lowest boiling point in the case of a mixture of two or more types of solvents, or the lowest boiling point in the case of a minimum boiling point azeotropic mixture).

Preheating can be carried out by using a jacket roller or induction heating roller that contacts the sheet on which a multilayer paint film is formed, or by a heating means such as an induction heating oven, infrared oven, gas heating oven or hot air oven.

In the present invention, organic resins such as high molecular weight polyester resin, polyester resin, epoxy resin, acrylic resin, urethane resin, fluororesin, vinyl chloride resin, olefin resin or ketone resin, inorganic resins such as siloxane, boron and borosiloxane resins, or organic-inorganic compound resins in which inorganic backbones such as siloxane or borosiloxane are introduced into an organic resin, may be used for the film forming component of the paint, while melamine resin, phenol, isocyanate or combinations thereof may be used for the curing agent.

Examples of solvents that can be used for the paint include xylene (boiling point: 140° C.), cyclohexane (156° C.), N-methylpyrrolidone (NMP) (200° C.), methyl ethyl ketone (MEK) (80° C.), isophorone (215° C.); isopropyl alcohol (83° C.) and Solvesso (trade name of product manufactured by Exxon Chemical).

In the present invention, popping was found to be able to be prevented with even greater reliability by making the amount of solvent in the paint applied to a layer other than the uppermost layer to be within 110 g/($m^2$×30 μm).

Figure 5:
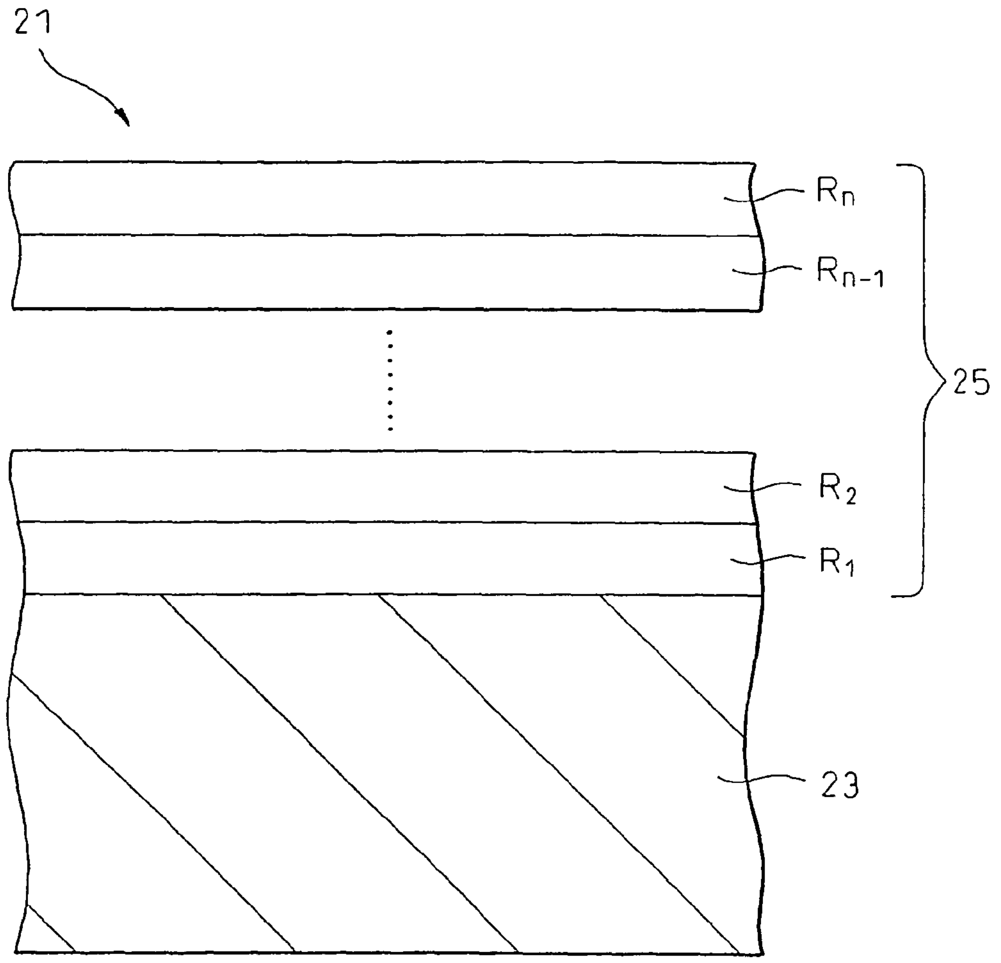
FIG. 5 is a schematic drawing illustrating a product of the present invention having a multilayer coated film.

A product of the present invention, having a multilayer coated film on the surface of a base material obtained by the aforementioned method of the present invention, is schematically shown in FIG. 5. In product 21 shown in this drawing, a multilayer coated film 25, composed of n layers of $R_1$, $R_2$, . . . $R_{n-1}$, $R_n$ is positioned on a steel sheet 23. This product is characterized in that, the boiling points of residual solvents contained in adjacent layers of this multilayer coated film (for example, layers $R_1$ and $R_2$) are in a relationship such that the boiling point of the residual solvent contained in layer $R_1$ closer to the base material (lower layer) is equal to or lower than the boiling point of the residual solvent contained in layer $R_2$ farther from the base material (upper layer), and the boiling point of the residual solvent contained in the layer $R_1$ closest to the base material is lower than the boiling point of the residual solvent contained in layer $R_n$ farthest from the base material. In another aspect of the present invention, when the total thickness of a multilayer coated film is 15 μm or less, as long as the condition is satisfied that the boiling point of the residual solvent contained in the lowermost layer $R_1$ closest to the sheet of the multilayer coated film is lower than the boiling point of the residual solvent contained in the uppermost layer $R_n$ farthest from the sheet, the residual boiling points of intermediate layers $R_2$, . . . $R_{n-1}$ other than lowermost layer $R_1$ and uppermost layer $R_n$ can be any arbitrary boiling points, namely the boiling points of the residual solvents of these layers may be equal to, lower than or higher than the boiling point of the residual solvent in the layer above or below them.

A base material in a product of the present invention may be a steel sheet or other sheet material. In the case of a steel sheet, a primer film may be formed on its surface, i.e., a primer film may be present between the steel sheet and a multilayer coated film formed according to the present invention. In a product obtained by coating a multilayer film according to the present invention on a steel sheet coated in advance with a primer, the roughness of the interface between the primer and the multilayer coated film thereon is about 0.1 μm, the interface between adjacent layers within the multilayer coated film is as was previously described, the center line average roughness Ra is 0.3 μm or more, and the maximum roughness Rmax is 2 μm or more.

Some residual solvent is detected in a multilayer coated film of a product obtained by the method of the present invention at, for example, about 0.5 to 1%. Residual solvent in a coated film of a product having a multilayer coated film of the present invention can be analyzed in the manner described below. In the following explanation, the product consists of a steel sheet coated with a multilayer film.

The steel sheet coated with the multilayer film to be analyzed is divided into a plurality of sample sheets of a measurable size. One of the divided samples is used as is, and the types of solvents are confirmed by heating to 230° C. in a non-open system, sampling the volatile gas and analyzing by gas chromatography to identify one or more types of components contained in the volatile gas. In the case two or more types of solvents are confirmed, a sample is used that contains one type of each confirmed solvent and for which the amount of that solvent is known in advance. The sample is then heated from room temperature to 230° C., the volatile gas is sampled and then analyzed by gas chromatography to prepare a calibration curve. Each peak value of the gas chromatography curve of the volatile gas of the aforementioned two types of detected solvents is then compared with the calibration curve to quantify the amount of volatile gas sampled.

Next, a different sample, in which the film of the uppermost layer has been removed to expose the lower layer directly beneath the uppermost layer is heated in the same manner as described above, the volatile gas is sampled and then analyzed by gas chromatography to identify the type of volatile gas while also preparing a calibration curve to quantify the amount of volatile gas.

Similarly, different samples are prepared by exposing each layer of the coated film, the types of gases that volatilized from within the remaining layers of these samples that were not removed are identified and quantified.

Using these results, by subtracting the value of the amount of gas determined for each type of volatile gas sampled from the sample for which one given layer was removed, from the value of the amount of gas determined for each type of volatile gas sampled from the sample prior to removing said given layer, the amount of gas can be determined for each type of volatile gas present in that layer. The type of volatile gas present in the largest amount among the amounts of each type of volatile gas is then taken to be the type of solvent contained in the largest amount in that layer.

On the other hand, the amount of solvent in each film can be quantified by heating each of the aforementioned samples from room temperature to 230° C., and measuring the thermogravimetric (TG) change during that time.

For example, in the case of a multilayer coated film composed of three layers, three types (or two types) of solvents are confirmed from the entire coated film having all three layers, two types (or one type) of solvents are confirmed when removing the uppermost layer, and one type of solvent can be confirmed from the coated film having the lowermost layer only.

The residual solvents of a multilayer coated film were analyzed for samples having a multilayer coated film formed from three layers of paint films for which the solvent boiling points were adjusted in accordance with the present invention, and samples of each layer for which the boiling points were not adjusted. In the case of either sample, three types of solvents were confirmed from the entire coated film having all three layers, two types of solvents were confirmed when removing the uppermost layer, and one type of solvent was confirmed from the paint film consisting of the lowermost layer only.

In the sample that applied the present invention, the boiling point of the solvent that was confirmed in the lowermost layer was the lowest as compared with the boiling points of the other solvents. Among the two types of solvents confirmed in the coated film that contained the lowermost layer and the intermediate layer above it, one of the solvents was identical to the solvent confirmed in the lowermost layer, and this was the solvent of the lowermost layer. On the basis of this finding, it is able to be assumed that either another solvent was used in the intermediate layer, or two types of solvents were both used. The boiling point of the aforementioned other solvent was higher than the boiling point of the solvent used in the lowermost layer. There were three types of solvents detected from the coated film containing three layers, two of those types were detected in the lowermost layer and intermediate layer, and the remaining type was used only in the uppermost layer without being used in the other films. The boiling point of this solvent of the uppermost layer was higher than the boiling point of the other types of solvents. The occurrence of popping was not observed in any of the samples that applied the present invention.

The same measurements as those described above were carried out on a comparative sample having a multilayer coated film composed of three layers in which the boiling points of the solvents were not adjusted. As a result, the occurrence of popping was observed in the case the boiling point of the solvent contained in the lowermost layer was not lower than the boiling points of the solvents contained in the other two films.

EXAMPLES

Figure 6:
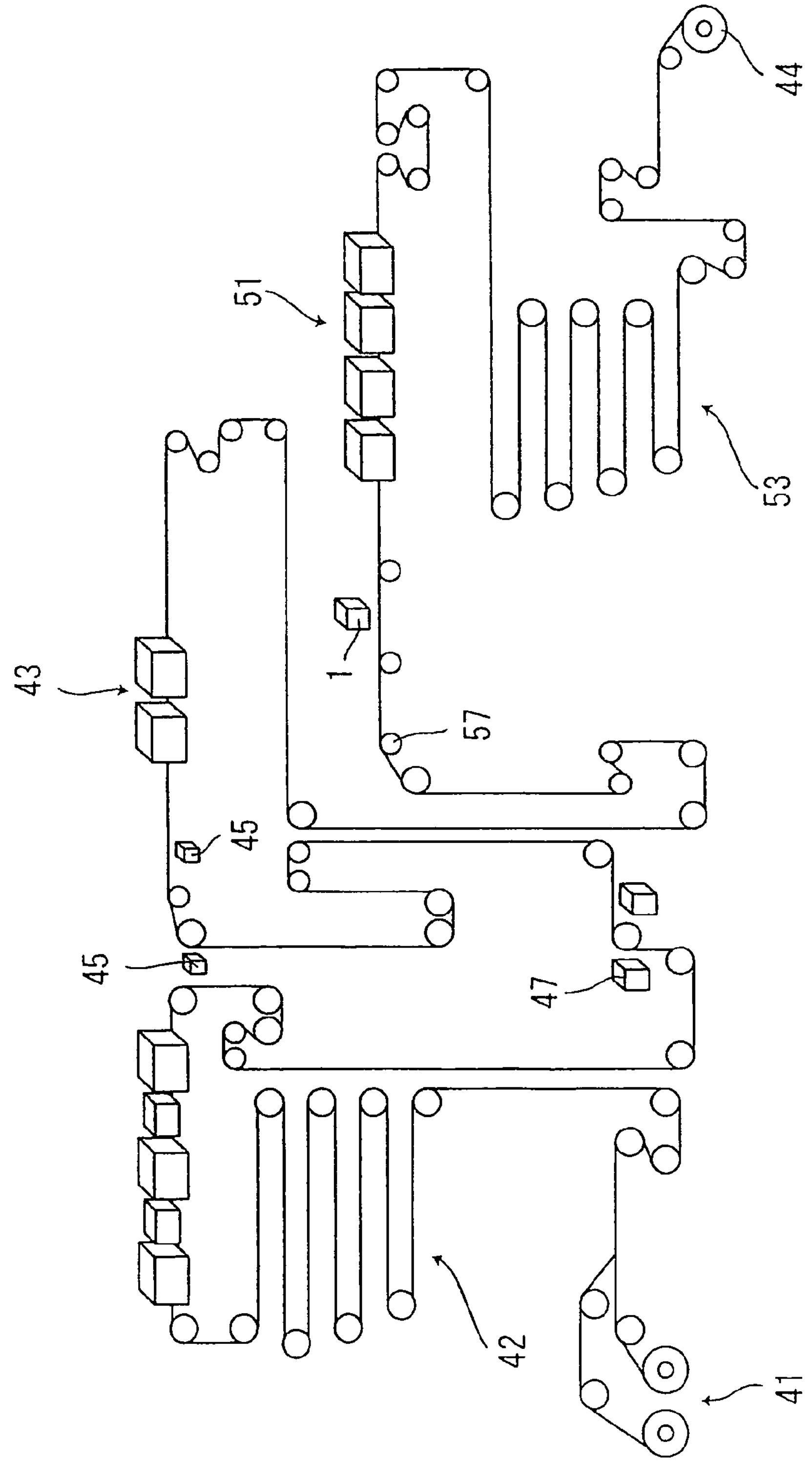
FIG. 6 is a drawing schematically showing equipment used to produce a product having a multilayer coated film according to the present invention.

The present invention was applied when curtain coating a multilayer film onto band steel on the precoated steel sheet production and treatment line shown in FIG. 6.

In the equipment shown in FIG. 6, coiled band steel is uncoiled with an uncoiler 41, and passed through an accumulator 42, a chemical conversion treatment device 47, a primer coater 45, and an induction heating oven 43. A sliding curtain application device 49 is disposed at a location following these devices, and a multilayer film is curtain-coated onto the surface of a moving steel sheet 11. Drying equipment in the form of an inducting heating oven 51 for drying the paint that has been applied is provided downstream from curtain coating device 49. After this, the steel sheet passes through accumulator 53 and is then coiled by a coiler 44 in the form of band steel on which treatment had been completed. A jacket roller 57 is used in the case of carrying out preheating treatment prior to the heating step.

A mixture of polyester and melamine and a mixture of polyester and isocyanate were used for the film forming components of the paint used in multilayer curtain coating device 49. In addition, cyclohexanone (anone) (156° C.), N-methylpyrrolidone (NMP) (200° C.) and isophorone (215° C.) were used for the solvents. The figures in parentheses shown after each solvent indicate their boiling points.

The coated film that was formed was observed with the naked eye and with a magnifying glass to investigate the occurrence of popping.

Example 1

A two-layer film was applied consisting of a paint layer that contains 50% by weight of a mixture of polyester and isocyanate in cyclohexanone (156° C.) and forms a dry film having a thickness of 30 μm for the bottom layer, and a paint layer that contains 50% by weight of a mixture of polyester and melamine in isophorone (215° C.) and forms a dry film having a thickness of 15 μm for the upper layer. Drying was carried out under conditions of a peak metal temperature (PMT) of 230° C. and heating time of 30 seconds.

As a result, a satisfactory two-layer coated film was able to be formed that was free of the occurrence of popping as observed both with the naked eye and a magnifying glass.

Comparative Example 1

A two-layer film was applied consisting of a paint layer that contains 50% by weight of a mixture of polyester and isocyanate in cyclohexanone (156° C.) and forms a dry film having a thickness of 30 μm for the bottom layer, and a paint layer that contains 50% by weight of a mixture of polyester and melamine in cyclohexanone and forms a dry film having a thickness of 15 μm for the upper layer. Drying was carried out under conditions of a PMT of 230° C. and heating time of 30 seconds.

As a result of the solvents of the two layers being the same and having identical boiling points, a coated film was formed in which the occurrence of popping was observed in a visual inspection.

Example 2

A three-layer film was applied consisting of an upper layer, intermediate layer and lower layer. A paint containing a 50% by weight mixture of polyester and isocyanate in a mixed solvent of 50 mol % cyclohexanone (156° C.) and 50 mol % NMP (200° C.) was used for the paint of the lower layer. The dry film thickness of the lower layer was 10 μm. A paint containing 50% by weight of mixture of polyester and melamine in a mixed solvent of 50 mol % cyclohexanone and 50 mol % NMP was used for the paint of the intermediate layer. The dry film thickness of the intermediate layer was 10 μm. A paint containing a 50% by weight mixture of polyester and melamine in isophorone (215° C.) was used for the paint of the upper layer. The dry film thickness of the upper layer was 5 μm. Drying was carried out under conditions of a PMT of 230° C. and heating time of 25 seconds.

Although the solvents in the lower and intermediate layers were the same and had identical boiling points, as a result of the total film thickness of the dried coated film being comparatively thin at 25 μm, a satisfactory coated film was able to be formed that was observed to be free of the occurrence of popping as observed both with the naked eye and a magnifying glass.

Example 3

A three-layer film was applied. A paint containing a 50% by weight mixture of polyester and isocyanate in a mixed solvent of 50 mol % cyclohexanone (156° C.) and 50 mol % NMP (200° C.) was used for the paint of the lower layer. The dry film thickness of the lower layer was 5 μm. A paint containing 50% by weight of mixture of polyester and melamine in a mixed solvent of 50 mol % cyclohexanone and 50 mol % NMP was used for the paint of the intermediate layer. The dry film thickness of the intermediate layer was 10 μm. A paint containing a 50% by weight mixture of polyester and melamine in isophorone (215° C.) was used for the paint of the upper layer. The dry film thickness of the upper layer was 10 μm. Drying was carried out under conditions of a PMT of 230° C. and heating time of 25 seconds.

Although the solvents in the lower and intermediate layers were the same and had identical boiling points, as a result of the total film thickness of the dried coated film being comparatively thin at 25 μm, popping was not observed in the paint film either with the naked eye or a magnifying glass.

Comparative Example 2

A three-layer film was applied. A paint containing a 50% by weight mixture of polyester and isocyanate in a mixed solvent of 50 mol % cyclohexanone (156° C.) and 50 mol % NMP (200° C.) was used for the paint of the lower layer. The dry film thickness of the lower layer was 10 μm. A paint containing 50% by weight of mixture of polyester and melamine in a mixed solvent of 50 mol % cyclohexanone and 50 mol % NMP was used for the paint of the intermediate layer. The dry film thickness of the intermediate layer was 10 μm. A paint containing a 50% by weight mixture of polyester and melamine in isophorone (215° C.) was used for the paint of the upper layer. The dry film thickness of the upper layer was 10 μm. Drying was carried out under conditions of a PMT of 230° C. and heating time of 25 seconds.

The solvents of the lower and intermediate layers were the same and had identical boiling points, and as a result of the total film thickness of the dried coated film being comparatively thick at 30 μm, the occurrence of popping was observed with the naked eye in the formed coated film.

Example 4

A two-layer film was applied consisting of an upper layer and a lower layer. A paint containing a 50% by weight mixture of polyester and isocyanate in a mixed solvent of 50 mol % cyclohexanone and 50 mol % NMP was used for the paint of the lower layer. The dry film thickness of the lower layer was 50 μm. A paint containing a 50% by weight mixture of polyester and melamine in isophorone (215° C.) was used for the paint of the upper layer. The dry film thickness of the upper layer was 30 μm. Drying was carried out under conditions of a PMT of 230° C. and heating time of 35 seconds, and in consideration of the boiling point of the solvent of the lower layer being 156 to 200° C. and the boiling point of the solvent of the upper layer being 215° C., the heating rate was controlled to 5° C./s over the range of 150 to 220° C.

Observation of the formed coated film with the naked eye and a magnifying glass did not reveal the occurrence of popping. As a secondary effect of temperature control, surface smoothness was observed to be improved as compared with other examples for which temperature control was not carried out.

Example 5

A two-layer film was applied consisting of an upper layer and a lower layer. A paint containing a 50% by weight mixture of polyester and isocyanate in a mixed solvent of 50 mol % cyclohexanone and 50 mol % NMP was used for the paint of the lower layer. The dry film thickness of the lower layer was 50 μm. A paint containing a 50% by weight mixture of polyester and melamine in isophorone (215° C.) was used for the paint of the upper layer. The dry film thickness of the upper layer was 30 μm. Drying was carried out under conditions of a PMT of 230° C. and heating time of 35 seconds.

This example is the same as Example 4 with the exception of not carrying out temperature control during drying. Since a comparatively thick coated film having a total dry film thickness of 80 μm was formed in the absence of temperature control, although popping was not observed in the coated film with the naked eye, it was observed with a magnifying glass (although products that are free of popping observable with the naked eye do not present a problem.)

Example 6

A three-layer film was applied. A paint containing a 50% by weight mixture of polyester and isocyanate in cyclohexanone (156° C.) was used for the paint of the lower layer. The dry film thickness of the lower layer was 20 μm. A paint containing 50% by weight of mixture of polyester and isocyanate in a mixed solvent of 50 mol % cyclohexanone and 50 mol % NMP was used for the paint of the intermediate layer. The dry film thickness of the intermediate layer was 30 μm. A paint containing a 50% by weight mixture of polyester and melamine in isophorone (215° C.) was used for the paint of the upper layer. The dry film thickness of the upper layer was 30 μm. Drying was carried out under conditions of a PMT of 230° C. and heating time of 35 seconds.

In contrast to forming a thick lower layer film having a thickness of 50 μm from a paint film containing a single mixed solvent in Example 5, in this example, a two-layer film corresponding to the lower layer of 50 μm of Example 5 was formed from a film of a first layer (20 μm) and second layer (30 μm) formed from two paints having the same solid matter but different solvent boiling points to obtain a coated film similar to Example 5. Popping was not observed either with the naked eye or with a magnifying glass in the coated film of this example as a result of making the boiling point of the solvent of the first layer lower than the boiling point of the solvent of the second layer.

Example 7

A three-layer film was applied. A paint containing a 50% by weight mixture of polyester and isocyanate in a mixed solvent of 50 mol % cyclohexanone (156° C.) and 50 mol % NMP (200° C.) was used for the paint of the lower layer. The dry film thickness of the lower layer was 5 μm. A paint containing 50% by weight of mixture of polyester and melamine in cyclohexanone was used for the paint of the intermediate layer. The dry film thickness of the intermediate layer was 5 μm. A paint containing a 50% by weight mixture of polyester and melamine in isophorone (215° C.) was used for the paint of the upper layer. The dry film thickness of the upper layer was 5 μm. Drying was carried out under conditions of a PMT of 230° C. and heating time of 25 seconds.

In this example, although the boiling point of the solvent of the paint of the lower layer is higher than the boiling point of the solvent of the paint of the intermediate layer, since the total dry film thickness is thin at 15 μm, solvent vapor is able to easily pass from the lower layer through the intermediate layer and upper layer during drying. As a result, popping was not observed in the coated film either with the naked eye or with a magnifying glass.

Comparative Example 3

Example 7 was repeated with the exception of making the dry film thickness of the upper layer 10 μm. In this comparative example, the total dry film thickness was 20 μm, which is greater than 15 μm, and since the boiling point of the solvent of the paint of the lower layer was higher than the boiling point of the paint of the intermediate layer, popping was observed in the coated film in observations with the naked eye.

Example 8

Several test pieces measuring 40 cm×40 cm were sampled from a precoated steel sheet having a multilayer coated film consisting of a 30 μm lower layer and a 15 μm upper layer formed using a multilayer sliding curtain application device. One of the test pieces was divided into strips, the divided test pieces were heated to 230° C. in a non-open system and the volatile gases were sampled followed by analysis by gas chromatography to identify the types of volatile gases. As a result, cyclohexanone, NMP and isophorone were detected. Therefore, each volatile gas was quantified by preparing a volatile gas calibration curve for each of these three types of solvents.

Next, volatile gases were collected from the lower layer film in the same manner as described above for a different test piece in which the upper layer film had been mechanically removed to expose the lower layer film, followed by identification of their components. As a result, cyclohexanone, NMP and isophorone were detected. When each volatile gas was quantified based on their calibration curves, since isophorone was only present in a trace amount, it was determined to have originated in the slight amount of the remaining upper layer that had failed to be removed. The amount of cyclohexanone and NMP were the same.

The amount of cyclohexanone from the coated film that contained the upper layer and lower layer, and the amount of cyclohexanone from the coated film of the lower layer only were equal when converted to moles. The amount of NMP from the coated film that contained the upper layer and lower layer was nearly equal to the amount of NMP from the coated film of the lower layer only. On the other hand, the amount of isophorone from the paint film of the lower layer only was minute in comparison with the amount of isophorone from the coated film containing the upper layer and lower layer.

In this manner, the solvent contained in the upper layer was recognized to be isophorone since a large amount of isophorone was contained in the upper layer, while there was hardly any cyclohexanone or NMP contained.

On the other hand, since equimolar amounts of cyclohexanone and NMP were contained in the lower layer, the solvent of the lower layer was determined to be a mixed solvent of cyclohexanone and NMP at a 50:50 molar ratio.

Since isophorone, having a boiling point that is higher than the mixed solvent of cyclohexanone and NMP, is contained in the upper layer, evaporation of solvent in the upper layer proceeds more slowly than evaporation of solvent in the lower layer. Popping was not detected in this multilayer coated steel sheet when examined with the naked eye and a magnifying glass.

Comparative Example 4

Several test pieces measuring 40 cm×40 cm were sampled from a precoated steel sheet having a multilayer coated film consisting of a 30 μm lower layer and a 15 μm upper layer formed using a multilayer sliding curtain application device. One of the test pieces was divided into strips, the divided test pieces were heated to 230° C. in a non-open system and the volatile gases were sampled followed by analysis by gas chromatography to identify the types of volatile gases. As a result, cyclohexanone, NMP and isophorone were detected. Therefore, each volatile gas was quantified by preparing a volatile gas calibration curve for each of these three types of solvents.

Next, volatile gases were collected from the lower layer film in the same manner as described above for a different test piece in which the upper layer film had been mechanically removed to expose the lower layer film, followed by identification of their components. As a result, cyclohexanone, NMP and isophorone were detected. When each volatile gas was quantified based on their calibration curves, since cyclohexanone and NMP were only present in trace amounts, they were determined to have originated in the slight amount of the remaining upper layer that had failed to be removed.

The amount of isophorone from the coated film that contained the upper layer and lower layer, and the amount of isophorone from the coated film of the lower layer only were nearly equal. On the other hand, the amount of cyclohexanone and NMP from the coated film of the lower layer only was minute as compared with the amount of cyclohexanone and NMP from the coated film that contained the upper layer and lower layer. When the amount of cyclohexanone and the amount of NMP were compared by defining the value obtained by subtracting the amount of cyclohexanone from coated film of the lower layer only from the amount of cyclohexanone from the paint film that contained the upper layer and lower layer as the amount of cyclohexanone in the upper layer, and defining the value obtained by subtracting the amount of NMP from the coated film of the lower layer only from the amount of NMP from the coated film that contained the upper layer and lower layer as the amount of NMP in the upper layer, their molar amounts were found to be equal.

In this manner, since the upper layer contained large amounts of cyclohexanone and NMP and hardly any isophorone, the solvent contained in the upper layer was recognized to be cyclohexanone and NMP. On the other hand, isophorone was determined to be contained in the lower layer.

Since a mixed solvent of cyclohexanone and NMP, which has a lower boiling point than isophorone, is contained in the upper layer, evaporation of the solvent in the upper layer proceeds before evaporation of the isophorone solvent in the lower layer. The occurrence of popping was observed in this multilayer coated steel sheet when examined with the naked eye.

Example 9

Example 1 was repeated with the exception of preheating to 80° C. using jacket roller 57 prior to the heating step in induction heating oven 51 of FIG. 6. The heating time in inducting heating oven 51 was shortened to 22 seconds, and a satisfactory two-layer coated film was obtained that was observed to be free of the occurrence of popping both with the naked eye and with a magnifying glass.

Comparative Example 5

Example 9 was repeated using a heating time of 22 seconds without preheating to 80° C. Popping was detected with the naked eye in the resulting coated film.

Example 10

Example 1 was repeated using a steel band on which was formed a non-chromate primer film (5 μm) of polyester-isocyanate curing system instead of a steel band not subjected to primer treatment. Popping was not detected in the formed two-layer coated film either with the naked eye or with a magnifying glass.

Comparative Example 6

Example 10 was repeated with the exception of using the same anone as the solvent of the paint of the lower layer for the solvent of the paint of the upper layer. The solvents of the lower and upper layers were identical and had the same boiling points, and as a result of the total dry film thickness being thick at 45 μm, the occurrence of popping was observed with the naked eye in the resulting coated film.

Example 11

Example 10 was repeated with the exception of changing the film forming component of the paint of the lower layer to a mixture of polyester and melamine. Popping was not detected in the resulting two-layer coated film either with the naked eye or with a magnifying glass.

Example 12

A three-layer film was applied to a steel band on which was formed a non-chromate primer film (5 μm) of polyester/isocyanate curing system. A paint containing a 50% by weight mixture of polyester and isocyanate in cyclohexanone (156° C.) was used for the paint of the lower layer. The dry film thickness of the lower layer was 30 μm. A paint containing 50% by weight of mixture of polyester and melamine in a mixed solvent of 50 mol % cyclohexanone and 50 mol % NMP was used for the paint of the intermediate layer. The dry film thickness of the intermediate layer was 15 μm. A paint containing a 50% by weight mixture of polyester and melamine in isophorone (215° C.) was used for the paint of the upper layer. The dry film thickness of the upper layer was 1 μm. Drying was carried out under conditions of a PMT of 230° C. and heating time of 30 seconds.

Popping was not detected in the resulting coated film either with the naked eye or with a magnifying glass.

An overview of the examples and comparative examples with the exception of Example 8 and Comparative Example 4 is shown in Tables 1 and 2.

TABLE 1

| | | Multilayer Coated Film | | | | | | | | | | | |
|---|---|---|---|---|---|---|---|---|---|---|---|---|---|
| | | 1st Layer (Lowermost Layer) | | | | | | 2nd Layer | | | | | |
| | Primer | Resin | Cure system | Solvent | Solvent boiling point (° C.) | Solid matter (%) | Dry film thickness (μm) | Resin | Cure system | Solvent | Solvent boiling point (° C.) | Solid matter (%) | Dry film thickness (μm) |
| Ex. 1 | — | Polyester | Isocyanate | Anone | 156 | 50 | 30 | Polyester | Melamine | Isophorone | 215 | 50 | 15 |
| Comp. Ex. 1 | — | Polyester | Isocyanate | Anone | 156 | 50 | 30 | Polyester | Melamine | Anone | 156 | 50 | 15 |
| Ex. 2 | — | Polyester | Isocyanate | Anone 50% NMP 50% | 156-200 | 50 | 10 | Polyester | Melamine | Anone 50% NMP 50% | 156-200 | 50 | 10 |
| Ex. 3 | — | Polyester | Isocyanate | Anone 50% NMP 50% | 156-200 | 50 | 5 | Polyester | Melamine | Anone 50% NMP 50% | 156-200 | 50 | 10 |

TABLE 1-continued

| | | Multilayer Coated Film | | | | | | | | | | | |
|---|---|---|---|---|---|---|---|---|---|---|---|---|---|
| | | 1st Layer (Lowermost Layer) | | | | | | 2nd Layer | | | | | |
| | Primer | Resin | Cure system | Solvent | Solvent boiling point (° C.) | Solid matter (%) | Dry film thickness (μm) | Resin | Cure system | Solvent | Solvent boiling point (° C.) | Solid matter (%) | Dry film thickness (μm) |
| Comp. Ex. 2 | — | Poly-ester | Iso-cyanate | Anone 50% NMP 50% | 156-200 | 50 | 10 | Poly-ester | Mela-mine | Anone 50% NMP 50% | 156-200 | 50 | 10 |
| Ex. 4 | — | Poly-ester | Iso-cyanate | Anone 50% NMP 50% | 156-200 | 50 | 50 | Poly-ester | Mela-mine | Iso-phorone | 215 | 50 | 30 |
| Ex. 5 | — | Poly-ester | Iso-cyanate | Anone 50% NMP 50% | 156-200 | 50 | 20 | Poly-ester | Mela-mine | Iso-phorone | 215 | 50 | 30 |
| Ex. 6 | — | Poly-ester | Iso-cyanate | Anone | 156 | 50 | 20 | Poly-ester | Iso-cyan-ate | Anone 50% NMP 50% | 156-200 | 50 | 30 |
| Ex. 7 | — | Poly-ester | Iso-cyanate | Anone 50% NMP 50% | 156-200 | 50 | 5 | Poly-ester | Mela-mine | Anone | 156 | 50 | 5 |
| Comp. Ex. 3 | — | Poly-ester | Iso-cyanate | Anone 50% NMP 50% | 156-200 | 50 | 5 | Poly-ester | Mela-mine | Anone | 156 | 50 | 5 |
| Ex. 9 | — | Poly-ester | Iso-cyanate | Anone | 156 | 50 | 30 | Poly-ester | Mela-mine | Iso-phorone | 215 | 50 | 15 |
| Comp. Ex. 5 | — | Poly-ester | Iso-cyanate | Anone | 156 | 50 | 30 | Poly-ester | Mela-mine | Iso-phorone | 215 | 50 | 15 |
| Ex. 10 | Non-chromate primer 5 μm | Poly-ester | Iso-cyanate | Anone | 156 | 50 | 30 | Poly-ester | Mela-mine | Iso-phorone | 215 | 50 | 15 |
| Comp. Ex 6 | Non-chromate primer 5 μm | Poly-ester | Iso-cyanate | Anone | 156 | 50 | 30 | Poly-ester | Mela-mine | Anone | 156 | 50 | 15 |
| Ex. 11 | Non-chromate primer 5 μm | Poly-ester | Melamine | Anone | 156 | 50 | 30 | Poly-ester | Mela-mine | Iso-phorone | 215 | 50 | 15 |
| Ex. 12 | Non-chromate primer 5 μm | Poly-ester | Iso-cyanate | Anone | 156 | 50 | 30 | Poly-ester | Mela-mine | Anone 50% NMP 50% | 156-200 | 50 | 15 |

TABLE 2

| | Multilayer Coated Film | | | | | | | | | | | |
|---|---|---|---|---|---|---|---|---|---|---|---|---|
| | 3rd Layer | | | | | | | Drying (Baking) | | | Appearance | |
| | Resin | Cure system | Solvent | Solvent boiling point (° C.) | Solid matter (%) | Dry film thickness (μm) | Total dry film thickness (μm) | PMT (° C.) | Time (s) | Heating controll | Popping | Note |
| Ex. 1 | — | — | — | — | — | — | 45 | 230 | 30 | — | No | — |
| Comp. Ex. 1 | — | — | — | — | — | — | 45 | 230 | 30 | — | Yes | — |
| Ex. 2 | Polyester | Melamine | Isophorone | 215 | 50 | 5 | 25 | 230 | 25 | — | No | — |
| Ex. 3 | Polyester | Melamine | Isophorone | 215 | 50 | 10 | 25 | 230 | 25 | — | No | — |
| Comp. Ex. 2 | Polyester | Melamine | Isophorone | 215 | 50 | 10 | 30 | 230 | 25 | — | Yes | — |
| Ex. 4 | — | — | — | — | — | — | 80 | 230 | 35 | 150-220° C., 5° C./s | No | Improved surface smoothness |

TABLE 2-continued

| | Multilayer Coated Film | | | | | | | | | | | |
|---|---|---|---|---|---|---|---|---|---|---|---|---|
| | 3rd Layer | | | | | | | | | | | |
| | | | | | | | | Drying (Baking) | | | Appearance | |
| | Resin | Cure system | Solvent | Solvent boiling point (° C.) | Solid matter (%) | Dry film thickness (μm) | Total dry film thickness (μm) | PMT (° C.) | Time (s) | Heating controll | Popping | Note |
| Ex. 5 | — | — | — | — | — | — | 80 | 230 | 35 | — | No (*1) | — |
| Ex. 6 | Polyester | Melamine | Isophorone | 215 | 50 | 30 | 80 | 230 | 35 | — | No | — |
| Ex. 7 | Polyester | Melamine | Isophorone | 215 | 50 | 5 | 15 | 230 | 25 | — | No | — |
| Comp. Ex. 3 | Polyester | Melamine | Isophorone | 215 | 50 | 10 | 20 | 230 | 25 | — | Yes | — |
| Ex. 9 | — | — | — | — | — | — | 45 | 230 | 22 | Preheating to 80° C. | No | — |
| Comp. Ex. 5 | — | — | — | — | — | — | 45 | 230 | 22 | — | Yes | — |
| Ex. 10 | — | — | — | — | — | — | 45 | 230 | 30 | — | No | — |
| Comp. Ex. 6 | — | — | — | — | — | — | 45 | 230 | 30 | — | Yes | — |
| Ex. 11 | — | — | — | — | — | — | 45 | 230 | 30 | — | No | — |
| Ex. 12 | Polyester | Melamine | Isophorone | 215 | 50 | 1 | 46 | 230 | 30 | — | No | — |

(*1) Popping was observed with a magnifying glass although it was unable to be determined with the naked eye.

The invention claimed is:

1. A product having a multilayer coated film on a surface of a base material, wherein a relationship between boiling points of residual solvents contained in adjacent layers of the multilayer coated film is such that a boiling point of a residual solvent contained in a layer closer to the base material (lower layer) is equal to or lower than a boiling point of a residual solvent contained in a layer farther from the base material (upper layer), and a boiling point of a residual solvent contained in a layer closest to the base material (lowermost layer) is lower than a boiling point of a residual solvent contained in a layer farthest from the base material (uppermost layer).

2. A product having a multilayer coated film according to claim 1, wherein the boiling points of the residual solvents contained in the layers that compose the multilayer coated film sequentially increase moving from the layer closest to the base material (lowermost layer) to the layer farthest from the base material (uppermost layer).

3. A product having a multilayer coated film according to claim 1, wherein a multilayer coated film of three or more layers is formed, wherein a thickness of the multilayer coated film is 25 μm or less and the boiling points of the residual solvents contained in two or more consecutive layers are equal.

4. A product having a multilayer coated film of three or more layers on a surface of a base material, wherein a thickness of the multilayer coated film is 15 μm or less, a boiling point of a residual solvent contained in a layer of the multilayer coated film closest to the base material is lower than a boiling point of a residual solvent contained in a layer farthest from the base material, and a boiling point or points of a residual solvent or solvents contained in one or more layers, excluding the layer closest to the base material and the layer farthest from the base material, are arbitrary.

5. A product having a multilayer coated film according to any of claims 1 to 4, wherein the composition of each layer of the multilayer coated film, excluding the residual solvent, is mutually different.

6. A product having a multilayer coated film according to any of claims 1 to 4, wherein a portion or all of the sets of adjacent layers of the multilayer coated film have the same composition excluding their residual solvents.

7. A product having a multilayer coated film according to any of claims 1 to 4, having a primer coated film beneath the multilayer coated film.

* * * * *